United States Patent [19]

Wiggins et al.

[11] 4,013,190
[45] Mar. 22, 1977

[54] FLAME ARRESTING AND EXPLOSION ATTENUATING SYSTEM

[75] Inventors: Edwin W. Wiggins, Bridgeton; Quentin C. Malmberg, Ferguson, both of Mo.

[73] Assignee: McDonnell Douglas Corporation, Long Beach, Calif.

[22] Filed: June 27, 1974

[21] Appl. No.: 483,940

Related U.S. Application Data

[63] Continuation-in-part of Ser. No. 252,104, May 10, 1972, abandoned.

[52] U.S. Cl. .............................. 220/22; 220/88 R
[51] Int. Cl.$^2$ ..................... B65D 1/24; B64D 37/08
[58] Field of Search ............ 220/85 R, 88 R, 88 A, 220/20.5, 21, 22, 20; 222/189; 431/346; 60/39.11

[56] References Cited

UNITED STATES PATENTS

| | | | |
|---|---|---|---|
| 2,305,923 | 12/1942 | Held | 220/88 R |
| 2,719,583 | 10/1955 | Malick | 220/88 A X |
| 2,850,083 | 9/1958 | Frost | 220/88 R X |
| 3,322,294 | 5/1967 | Nemeth | 220/88 R X |
| 3,349,953 | 10/1967 | Lonaway et al. | 220/88 R X |
| 3,356,256 | 12/1967 | Szego | 220/88 A |
| 3,490,644 | 1/1970 | Redburn | 220/88 A |
| 3,561,639 | 2/1971 | Allen | 220/88 R |
| 3,661,295 | 5/1972 | Gronwald et al. | 220/88 A X |
| 3,691,620 | 9/1972 | Harn | 220/88 R X |
| 3,711,259 | 1/1973 | Gurney | 220/88 A X |

FOREIGN PATENTS OR APPLICATIONS

| | | | |
|---|---|---|---|
| 705,745 | 3/1965 | Canada | 220/88 A |
| 736,802 | 6/1966 | Canada | 220/88 A |
| 1,052,912 | 3/1959 | Germany | 220/88 R |
| 531,610 | 1/1941 | United Kingdom | 220/88 A |

OTHER PUBLICATIONS

"Plastic Foam Fills Fuel Tanks to Suppress Explosion Hazards" *Product Engineering*, 11/20/1967, pp. 127–128.

*Primary Examiner*—George E. Lowrance
*Assistant Examiner*—Stephen Marcus
*Attorney, Agent, or Firm*—G. W. Finch; W. J. Jason; D. L. Royer

[57] ABSTRACT

A flame arresting and explosion attenuating system particularly for use in fuel tanks and other similar structures which are designed to contain highly inflammable fluids. The tank or enclosure may be a single compartmented or it may be divided or partitioned into a plurality of individual fuel cells of compartments at least some of which communicate with one another through openings or apertures in the partitions which form them. The subject system is designed to prevent the propagation of flame supported by combustion of the fluid within the tank and to quench the flame when it tries to spread from one compartment to another and to attenuate the explosive forces generated due to ignition of fluid by allowing the forces thereof to be distributed over the total volume of the enclosure so that there is little or no likelihood of the explosion damaging the enclosure. These and other things are accomplished by the present system at low weight and volume penalties and without unduly restricting or reducing fluid flow circulation and communication between the cells. The subject system includes one or more porous members positioned at locations in the enclosure where compartments communicate and they may serve themselves to compartmentalize the container. Preferably at least a portion of some of the said porous members should extend across a liquid-gas interface. The subject members are of sufficiently open-celled constructions to permit relatively unrestricted liquid and gas flow therethrough, but the size of the pores is also important and should be such as to act to arrest or quench the propagation of a flame when it comes in contact therewith and tries to pass through thereby preventing flame from passing from one compartment to another in the enclosure. The porous members may also be wetted by the fuel and act as heat sinks.

1 Claim, 18 Drawing Figures

FLAME ARRESTING AND EXPLOSION ATTENUATING SYSTEM

This is a continuation-in-part of our earlier filed copending application Ser. No. 252,104, filed May 10, 1972 and assigned to the same assignee, now abandoned.

All embodiments of the subject means prevent the passage or spread of flame between compartments of the enclosure without otherwise substantially restricting or preventing the circulation of the contents. As indicated, the subject devices operate to arrest and/or quench flame and at the same time attenuate and minimize the effects of an accompanying explosion by distributing the isolated combustion forces thereof over a larger volume than the volume of the container portion in which it was produced. The invention contemplates use of layers, blocks, hollow members, and other forms of the subject open-celled or porous material geometrically configured to reduce their weight and to minimize volume loss, and it is contemplated to position such layers or members at various suitable locations in a chamber or compartment such as in a single compartment or multi-compartment fuel tank. The geometry and other structural characteristics including pore size of the open-called members are important to the operation while the geometry and other structural features of the containers or tanks in which they are installed are relatively unimportant. Many possible embodiments of the present open-celled members are possible and some few of these are disclosed in this specification.

This invention relates in general to certain new and useful improvements in flame arresting and explosion attenuating systems, and more particularly to such systems that use open cellular members or devices of low weight and volume displacement which permit relatively unrestricted circulation of the contents and do not prevent normal use and operation of a fuel tank or other container. The term "flame arresting" as used in this specification is given a fairly broad meaning to include "flame attenuation" as well as "flame quenching".

There are a number of available inerting or flame arresting systems presently known and in use including some that are used in fuel systems such as in fuel tanks and other structural enclosures for the storage of highly inflammable fluids such as fuels or the like. For the most part, the known inerting and extinguishing systems are designed to prevent ignition of the flammable fluid or to eliminate flame propagation. These include various inert dilutents or flame extinguishing or suppression means such as means for introducing a nonflammable liquid or gas such as nitrogen into the container, or introducing a substance such as a halogen fire extinguishing material into the tank or enclosure under certain conditions such as in response to the detection of a predetermined pressure, radiation or excessively high temperature, and they include other forms of manual and automatic means usually involving fairly complicated devices having movable parts. Plastic or metal foams, felts, screens, honeycomb and like devices introduced into and filling the tank with these flame arrestor materials have been found to be moderately effective in some applications in that they serve only to prevent the spread of the flame but not as explosion attenuators. These same material configurations have been used as flame barriers for apertures on vent systems. However, all known systems either prevent or extinguish the flame propagation, while not attenuating explosions or they have other undesirable aspects in that they make the tank and/or the contents thereof unusable and inoperative, and/or they impose large weight, displacement, maintenance and reliability penalties, and this cannot be permitted in certain cases such for example as in aircraft fuel tanks.

Some prior art constructions having also included tanks which are subdivided into a plurality of cells certain of which are allocated for containing fuel and others for containing flame inhibitor substances of some kind. In the event of an explosion in such a structure, a partition or other member that normally prevents communication between the different types of cells will rupture to permit the flame inhibitor material to enter fuel cells rendering the latter non-flammable or otherwise unusable. While such systems are moderately effective for extinguishing flame and preventing the spread thereof they add considerably to the weight and complexity of the container and they are subject to leakage, accidental or otherwise, as well as other failures and there is a high risk that they may destroy the fuel system accidentally. They also substantially reduce the fuel carrying capacity of a given space. For these and other reasons, such systems have not enjoyed wide usage.

Many of the known systems that use inerting means have been designed for use in aircraft and particularly military aircraft where there is a fairly high risk of fuel tank fires. These systems are designed to protect aircraft against accidental and other forms of fuel ignition including protection against the resulting explosions. There is considerable interest in improving the safety of fuel tanks including also fuel tanks on commercial aircraft as well as fuel tanks used for other purposes such as automobile fuel tanks, and other tanks used for storing highly flammable substances. Aircraft fuel tanks present special problems, however, because they are usually divided into a plurality of communicating compartments or cells distributed throughout the plane including the wings and some of the compartments are separated from each other and by internal structural partitions with transference aperatures and other communication means that permit intercommunication and fuel circulation therebetween. Many military aircraft have single compartment fuselage fuel tanks and multi-compartment or partitioned wing tanks while most commercial aircraft have compartmentalized wing tanks only. The known inerting systems, however, impose serious structural, operational, design, weight, capacity and expense limitations on such fuel systems and they also add considerably to the complexity of the tanks they seek to protect. For these and other reasons they are unsatisfactory. Furthermore, the known systems not only reduce fuel storage capacity but they may cause a fuel tank to become inoperative at a critical time and they may prevent the free flow circulation of fuel between the various compartments and between the inlets and outlets of the tank. These conditions obviously cannot be tolerated in certain applications such as in airborne situations as well as many others.

It is therefore a principal object of the present invention to provide means for making fuel tanks and other inflammable liquid storage means safer.

Another object is to confine fires in fuel tanks and like strutures to relatively small regions and to prevent their spread.

Another object is to compartmentalize the inside of a fuel storage container with means capable of preventing the spread of flame but which do not interfere with normal container operations including normal fuel circulation.

Another object is to confine fires in fuel tanks and like structure to relatively small regions and to prevent their spread while attenuating the combustion overpressure eliminating structural damage.

It is another object to provide a flame arresting system for fuel tanks and other structural enclosures which includes porous means which are wetted by the fuel to form a flame arresting barrier between different portions of the tanks.

It is another object to teach the construction and operation of a flame arresting system using open-celled foam-type arresting materials which are relatively lightweight and do not displace much fluid capacity, usually less than about 2% of the capacity.

Another object is to provide a compressible open pore foam or foam-like structure which can be installed in almost any size and shape opening or chamber without requiring separate fastener means, and which will operate to quench a flame that tries to pass through it and attenuate the accompanying explosion.

Another object is to provide a porous flame barrier which when wetted also acts as a heat sink.

It is a further object of the present invention to provide a flame arresting system which is relatively simple to install and can be installed in new as well as in existing fuel tanks and other structural enclosures without requiring separate sealing and fastener means.

It is an additional object to provide a flame arresting system for fuel tanks and the like which does not materially restrict the normal flow of fluids contained therein.

Another object is to provide means to efficiently arrest the propagation of flame in highly combustible environments and which means can be used to compartmentalize single chamber container structures as well as being used on or in conjunction with the partition means in multi-cell enclosures with and without cell-to-cell communication.

It is another object to teach the use of flame arresting members or devices in all or in some of the cells of a multi-cell enclosure such as a multi-cell fuel tank to prevent the spread of flame.

Another object is to minimize the chances for structural damage to fuel tanks as a result of explosions produced therein.

Another object is to confine the area of flame and prevent its spread in an enclosed structure while permitting the forces of an explosion produced in a portion only of the structure to be dissipated throughout the structure.

These and other objects and advantages of the present invention will become apparent after considering the following detailed specification of several practical embodiments of the subject system in conjunction with the accompanying drawings, wherein:

Referring more in detail and by reference characters to the drawings which illustrate some of the many possible practical embodiments of the present invention, the number 20 designates a fuel tank or similar structural enclosure of a type such as might be used in the wing of an aircraft or the like. The tank 20 may be constructed as an individual self-contained unit inserted into a recess or other area allocated for this purpose in a host structure such as an aircraft wing, or the tank may be constructed as an integral part of the host structure. In either case, the tank 20 may be constructed as a single or as a multiple compartmented structure. If a multi-compartment structure is to be used, then at least some of the different compartments should be in flow communication with each other so that the tank can be filled and emptied expeditiously and fuel can circulate without difficulty and as desired.

Figures 1, 2, 4:
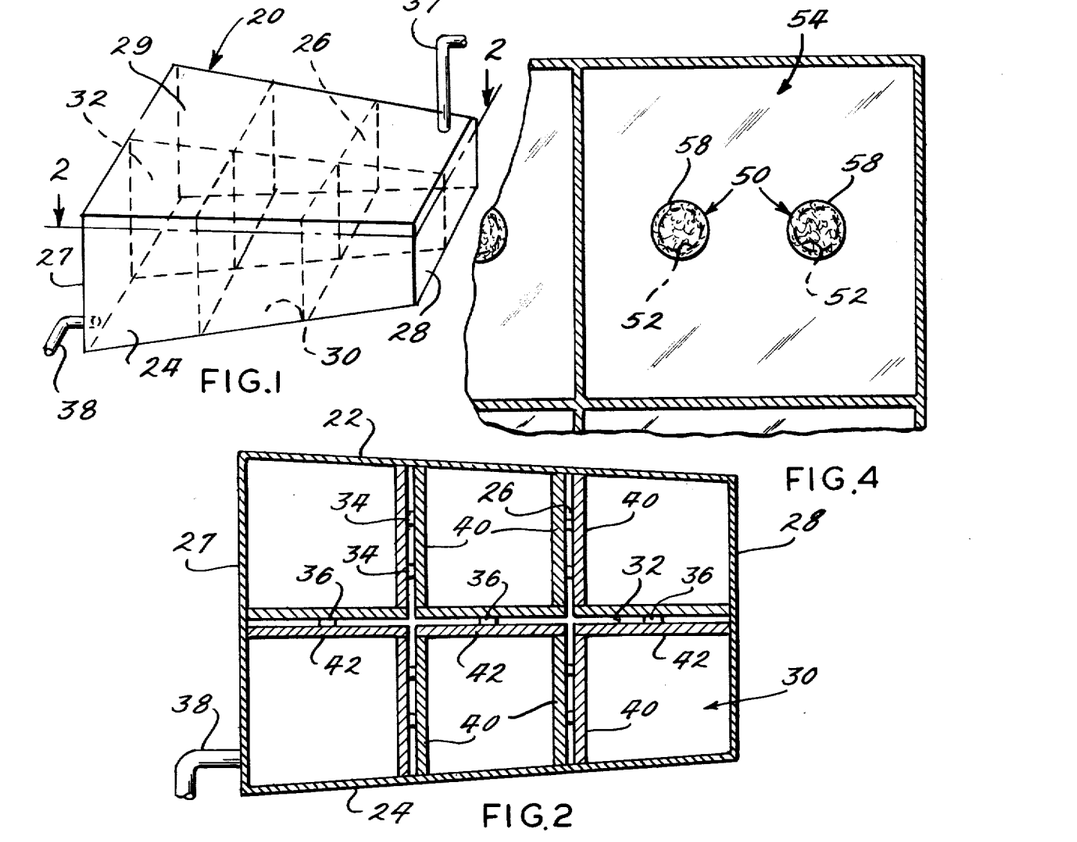
FIG. 1 is a perspective view showing a multi-compartment fuel tank in which the compartments are in free flow communication, said tank including means to prevent the spread of flame from one compartment to another and to attenuate the forces of an explosion produced therein.
FIG. 2 is a cross-sectional view taken along line 2—2 of FIG. 1.
FIG. 4 is a fragmentary cross-sectional view taken along line 4—4 of FIG. 3.

FIGS. 1 and 2 show the multi-compartmented fuel tank 20 constructed as an integral part of the wing structure of an aircraft. The tank comprises spaced front and rear side walls 22 and 24 connected by transverse ribs 26, opposite end walls 27 and 28, and top and bottom walls 29 and 30, respectively, which may be the upper and lower skins of the wing itself. Whether the tank is formed as an integral unit unto itself or as part of the host or wing structure it is divided structurally or compartmentalized into a plurality of individual compartments of fuel cells. This can be done structurally by means of the ribs 26 and/or by means of one or more longitudinally extending partitions or "spars" 32 as required. The ribs 26 and spars 32 in the case of an airplane wing may be the regular structural ribs and spars that form the wing.

Each of the compartments or cells communicates with the others through various openings formed by the structural members through specially constructed openings such as the openings 34 and 36 sometimes called "lightning holes" provided to lighten the weight of the wing structure. These openings 34 and 36 should be constructed and located to permit substantially uninterrupted fluid flow communication and fuel transfer between all of the various cells or compartments in the tank. The number and size of the cells and of the openings therebetween will vary from tank to tank depending on the intended application and the environment in which the tank is used. In most cases, the spars and ribs are located to provide the desired rigidity and strength and to otherwise enhance the structural integrity, and their designs and shapes are governed by aerodynamic considerations. The number of transfer openings 34 and 36 and their relative positions are also determined by various considerations including the type of fuel or other material which is to flow, the desired flow rates to be maintained and to prevent trapping fuel in portions of the tank. The structural members are usually also constructed of a metal material such as steel, aluminum, magnesium, and alloys of these and other metals, and they may be provided with protective linings or coatings to minimize corrosion and for other reasons. Fuel tanks having these and other similar structural characteristics are well known.

Fuel tanks of the type illustrated in FIGS. 1 and 2 are generally also provided with one or several inlets, such as one or more fuel inlet ports or ducts 37 for filling the tank, and with one or several outlets for fuel delivery to the engines as illustrated by fuel line 38. Various control means (not shown) may also be provided at suitable locations in or adjacent to one or more of the cells to be operated by means controlled by the pilot or by some form of automatic control means that control the flow of fuel as well as the environment in the tank and for other purposes.

The subject flame arresting means can be designed to have many forms and shapes so that they may be used in either single-cell or multi-cell tanks and other structural enclosures for containing ignitable and flammable liquids and/or gases. In all cases, the flame arresting means are either associated with partitions which subdivide the structure into communicating chambers or compartments or they serve themselves to divide the tank into compartments which are isolated from each other to prevent the propagation of flame from compartment to compartment but not to otherwise prevent the free flow of fuel throughout. The subject flame arresting means are porous structures made of materials such as plastics that are relatively uneffected by the fuel but serve to prevent the passage of flame therethrough. When a flame tries to pass through the subject porous members it will in so doing be arrested and quenched, while at the same time, the pressure forces produced by the flame or explosion in one or more of the compartments are free to pass through the arrestor material and to dissipate themselves throughout the entire internal confines of the tank. The advantages of being able to prevent the spread of combustion thus neutralizing or minimizing the effects of explosion with a minimum of displacement, and without interrupting normal tank operation, are at the heart of the present invention.

When used in multi-cell enclosures of tanks, such as the wing tank illustrated in FIGS. 1 and 2, layers of the subject porous flame arresting material are located at or attached to the partitions between the compartments and over all of the openings 34 and 36 therein. The arrestor materials and the devices made therefrom as already explained, may have a wide variety of forms, shapes, sizes and thicknesses depending on how and where they are to be installed. In the embodiment of FIG. 2 they are shown as layers 40 and 42 of foam arrestor material located adjacent to the ribs 26 and the spar 32. The foam material used in the construction of the layers 40 and 42 is porous and relatively lightweight, and the size or diameter of the pores in the material is selected to produce the desired quenching action. The pores are also constructed to permit full communication and circulation of the contents of the tank throughout. The desired quenching action produced by the subject layers refers to the ability of the said members or layers to extinguish flames that come in contact therewith and try to pass through. The action of the foam material in quenching or extinguishing a flame is somewhat similar to the action produced by a screen placed over an open flame such as the flame of a Bunsen burner. In the Bunsen burner case, the flame striking the underside of the screen will spread out and try to pass around the edges of the screen but will not pass directly through it. The same is true of the present device, except that with the present device the pores may be larger than the screen openings as a screen is made up of a single layer of material whereas the porous member simulates many layers, thus providing a length or distance to the quenching action and they may also be filled and blocked by being wetted by the fuel. The wetting of the pores is caused by capillary action and has little effect on the quenching action particularly at the higher pressures such as when an explosion occurs in one of the compartments and blows outwardly through the pores. The inability of a flame to pass through a screen or porous structure is at the heart of the present invention. Certain foam or foam-like materials, and certain pore sizes give the best results in each case depending on many factors including the tank pressure and the type of fuel, and the porous material should be selected to be able to withstand the temperature and other environmental conditions encountered including the heat produced during an explosion. In some cases, it may be sufficient or even preferred to use perforated barriers or grids other than those formed of foam including perforated metal structural members although this has not been found necessary for most purposes and such members are usually too expensive and too difficult to make and install as compared to simple plastic foam members. Also, metal screens or grids may present undesirable weight factors. Even so, metal screens or grids could be used and are contemplated as being within the scope of the invention.

Referring again to FIG. 2, the layers of flame arrestor material 40 and 42 are disposed in surface-to-surface engagement with the ribs 26 and spars 32 between the adjacent tank compartments and in this way isolate the compartments from each other as far as flame propagation is concerned. This therefore provides maximum protection against the spread of flame in the tanks.

In some cases it may also be desirable to apply porous layers to all or more of the interior surfaces of the structural walls, including the top and bottom walls 29 and 30 as well as to the front and rear walls 22 and 24 which may also be spars in a wing construction. The layers may be retentively held against their respective walls by suitable clamps or other mechanical or adhesive fasteners (not shown) or by a suitable bonding agent such as an epoxy resin or the like. In most cases, where the layers are to be anchored or attached, a bonding agent is preferred because of the ease of application and the fact that bonding agents do not add substantial additional weight and volume to the structure. The selection of a bonding agent, however, must take into account its possible effect or reaction with the fuel or other substances to be contained within the tank. Epoxy bonding resins and similar bonding agents have been found to be effective securing means for most plastic type arresting materials since such agents are relatively chemically inert and do not react with most petroleum fuels and similar products.

The structure and placement of the arresting material are important. The material itself as explained is preferably an open-celled porous material such as a reticulated polyurethane foam and essentially almost any plastic foam or foam-like material which can stand up to the environment conditions can be used. Examples of other substances that can be used for the subject porous structures include Teflon, rubber derivatives, cellulose compositions, Nylon compositions and other plastic or plastic-like compositions, whether flexible or rigid, and the selection will depend upon the particular characteristics desired. In some cases, for code or specification compliance, the selected substance may be required to be treated with flame retardants or flame inhibitors, such as with the various known organophosphorous compounds for added protection. Essentially any open-celled material which is capable of permitting relatively unrestricted liquid and gas flow therethrough, and which has a relatively high ignition temperature may be used. Regarding ignition characteristics, the flame arrestor material should preferably have an ignition temperature that is as high as possible. The expected time of exposure to the flame should also be taken into account. Porous and foamed metals such as porous and foamed steel, aluminum, nickel, copper and alloys of these and other materials may also be used for the construction of the flame arrestor member but are not usually preferred. It is also contemplated as in the case of plastic members to coat a metal substrate as well as the tank wall with a coating of a plastic or other similar porous material such as with one of the cellulosic foam plastics in order to provide the desired flame arresting protection.

It is important to recognize that the subject porous material can be operated to produce the desired flame quenching and explosion attenuation while in either a wet or a dry condition. This is true even though it is recognized that in some cases there may be some, usually relatively small, advantages in having the material wetted by the fuel so that a heat sink effect will be produced. This is true regardless of whether the porous material extends across a liquid-gaseous interface in the tank. However, since a flame can only exist in a gaseous phase portion of the tank, the porous member or members should be so constructed and located in the tank that they subdivide the tank interior into distinct chamber portions as already described. Furthermore, if it is desired to increase the wetting characteristics of the porous member chemical introfiers may be incorporated in the flame arresting material or added to the fuel.

The pore size of the open-celled material will vary with many factors including the density of the material, and as a general rule a lower density material usually has a smaller pore size and/or a larger pore density in order to produce the same flame arresting properties. In any case, however, the pore size of the arrestor material should be large enough to permit relatively unrestricted liquid and gas flow or circulation between compartments with no more than a slight pressure differential ever appearing between adjacent compartments. Thus the arrestor material should not interfere with normal movement of the fuel in the tank except as it may minimize the amount of sloshing that can occur. The pore density in a typical case may be as low as ten pores per lineal inch and even lower, and it may be as high as forty or more pores per lineal inch. For most fuels, a pore density in the range of from about fifteen to about twenty-eight pores per lineal inch produces satisfactory results. In a preferred embodiment using a reticulated polyurethane foam, a pore density of about twenty-five pores per lineal inch provides very satisfactory results.

The selected arrestor material may be deposited or otherwise attached and it can be used in one or more layers over the entire wall surface or only those portions where the adjacent compartments communicate. The thickness of the layer or layers of arrestor material will depend on a number of factors including the volume or capacity of the compartments, the surface areas of the layer or layers which may be exposed to flame or explosion, the shape of the space in which material is installed, the composition of the explosive mixture, and the anticipated forces generated by an explosion. The magnitude and force of an explosive wave which is generated and its effect on the subject structure may also be a factor in determining the structural characteristics including the most desirable pore size and layer thickness. This in turn should take into account the fact that the liquid to gas ratio in the tank will vary substantially as the tank goes from a full to an empty condition. Usually, however, the larger the volume of an enclosure the thicker will be the required layer or layers of flame arrestor material. As can be expected, the pore size of the selected arrestor material may also be an important factor in determining the best layer thickness. As a general rule, arrestor materials having relatively large pore sizes, and hence low pore densities, must be made or applied in thicker layers than those with smaller pore sizes. For example, in one case a polyurethane foam arrestor material having a pore density of about ten pores per lineal inch and a material density of 1.86 lbs/ft$^3$, required a layer thickness of approximately eight inches to satisfactorily arrest flame propagation. In another case, using a polyurethane foam having a pore density of about twenty pores per lineal inch with a foam density of 1.36 lbs/ft$^3$, a layer thickness of only about one inch was needed to provide the same flame arresting properties. The pore size and pore density should, as far as possible, be selected to permit as free a flow or circulation of fuel as possible while at the same time it must be recognized that some slight flow reduction may be produced but this is usually not objectionable.

It should be recognized that in liquid fuel containers such as in fuel tanks, most of the fuel is usually in a liquid state and the space above the liquid fuel is occupied by a gas, usually air, with some amount of the liquid fuel evaporated therein. Obviously, it is only possible to sustain combustion in the gaseous phase which means that the fuller the tank, the less space is available to support combustion. A full tank therefore theoretically has no space in it to support combustion. It is important, however, to have the subject flame quencher action regardless of how full the tank is and therefore the quencher material should preferably extend from as near to the bottom of the tank to as near to the top as possible. The portion of the quenching material that is submerged in the liquid phase will therefore be completely wetted and the portion extending above the liquid surface will be wetted by the capillary action of the member and the liquid.

It is important to recognize that the forces and pressures associated with an explosion in one compartment are able to pass through the subject porous members blowing any flame that may be present through the pores and quenching them in the process while at the same time causing the forces of the explosion to be dissipated or attenuated throughout the entire interior of the tank and not just in that portion or portions where the explosion occurred. This is highly desirable since it is this fact that minimizes the possibility for structural or other damage to the tank and therefore also minimizes the possibility that the tank will become inoperative. These actions, namely the flame quenching action, the action of dissipating the forces of explosion over a large area, the limited action of the heat sink produced by the wetting of the porous member, and the free flow communication available at all times, combine to minimize fire and structural damage and substantially reduce the possibility that the tank will be completely knocked out of service or that the flame will spread to other nearby parts.

Figure 3:
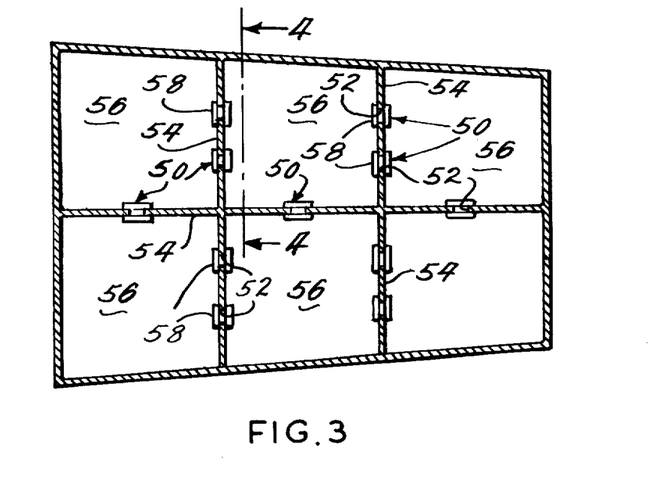
FIG. 3 is a cross-sectional view similar to FIG. 2 but showing a modified form of the fuel tank wherein the flame arrestor or flame quenching material is positioned only adjacent to apertures in partitions between adjacent tank compartments.

In many cases, it may not be necessary to completely cover or enclose the inner surface of a compartment to provide adequate protection and several such constructions are disclosed herein. FIGS. 3 and 4 illustrate another construction wherein the flame arresting system is formed by a plurality of porous flame arresting plugs 50 inserted in or adjacent to transfer apertures 52 formed in the partitions 54 between adjacent compartments 56. The plugs 50 are shown for illustrative purposes as being round plugs and are formed to be somewhat thicker than the partitions 54 on which they are installed. The plugs 50 may be made of relatively resilient material for ease and convenience of installation, and they may have an outside diameter that is greater than the diameter of the transfer apertures 52 so that they must be squeezed or compressed to be installed. When installed in this way each member entirely fills and closes its aperture and the peripheral or flange portions 58 thereof engage opposite surfaces of the partitions to hold them in place. Plugs similar to the plugs 50 can also be secured in place by other types of means including clamp means, adhesives, fastener devices and so forth.

The plugs 50 operate in substantially the same way as the layers described above to confine and quench flame and to distribute the forces of an explosion throughout all communicating cells of the tank. The plugs 50 preferably are located so that they will be at least partially submerged in the liquid phase of the fuel and will become sufficiently surface wetted to obtain the benefits of acting as heat sinks. The plugs 50, as with the other forms of the device, are constructed to permit relatively unrestricted fluid flow therethrough and to prevent excessive pressure differentials from existing thereacross. They should also be installed so that they cannot be blown out of their installed positions by the forces of explosion.

The present invention includes other forms of the subject flame arresting devices for locating in fuel tanks and some examples of these will be described including some for use in single compartment tanks and some for use in multiple compartment tanks. These may be constructed in a wide variety of forms, shapes and sizes depending on the type and structure of the tank, the type of fluid or fuel to be placed in the tank, the dimensions of the tank and other considerations. Some tank embodimnts may also have a plurality of the present elements in each compartment and some only one. Some typical examples of these possibilities will be described.

The shape and geometry of the particular structural enclosure or tank in which the subject devices are used are relatively unimportant to the invention so long as the devices can be properly installed and located. The geometric construction and shape of the devices themselves, however, as already stated may be of considerable importance to their operation in a particular application. The important thing is that they and/or the partitions or walls with which they are used, divide the inside of the enclosure into a plurality of communicating compartments each separated from the adjacent compartments at least in part by the subject porous flame arresting devices. The subject devices must be constructed with sufficient surface area and pore size to permit rapid flame quenching and yet permit relatively unrestricted flow communication. As already stated, the subject devices may be secured to one or more of the partitions or walls and they may be held in place by various means such as by clamps, adhesives, or other forms of fasteners, they can be suspended or supported by guy wires or like members, and they can be held in place simply by being compressed between two or more surfaces. Some forms of the present devices can also be made as hollow members or members having portions removed to define chambers or cavities in them. These may be referred to as voided embodiments and have the advantages of minimizing the amount of fuel they displace. The gross-voided configuration, using hollow forms also weigh less which is advantageous in most cases.

The size and positions of the subject flame arresting devices as mentioned above, also enable them to function effectively as anti-slosh devices to reduce or minimize undesired and sudden movements of the fuel. This can be especially desirable in aircraft where sudden fuel movements can cause unstable dangerous flying conditions especially during changes in the altitude of the aircraft and under turbulent and other flight conditions. For these and other reasons, certain forms of the present devices may be preferred over others.

Figure 5:
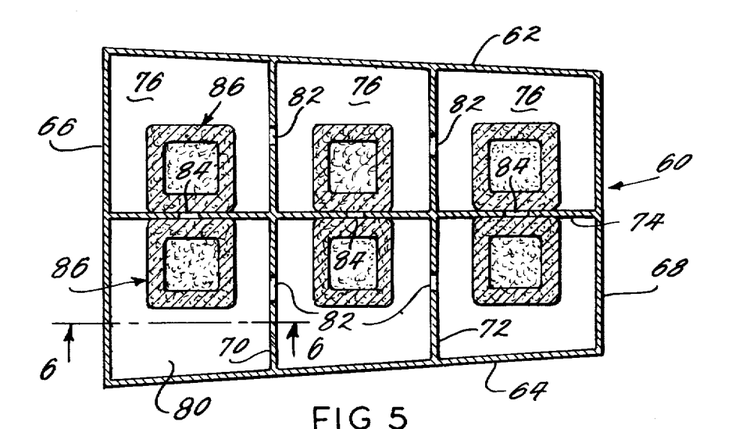
FIG. 5 is a cross-sectional view similar to FIG. 2 showing another tank construction wherein portions only of each of the tank compartments are provided with flame arresting voided blocks.
Figure 6:
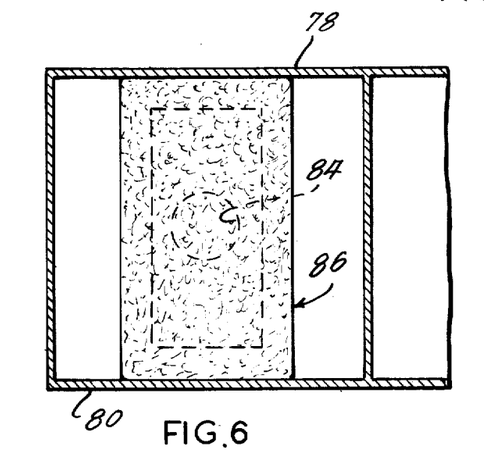
FIG. 6 is a fragmentary cross-sectional view taken on line 6—6 of FIG. 5.

The multi-cell wing fuel tank embodiment 60 illustrated in FIGS. 5 and 6 is very similar in tank structure to the tank 20 described above. For example, the tank 60 includes spaced front and rear spars or walls 62 and 64, opposite end walls 66 and 68, the wall 66 being adjacent to the fuselage of the aircraft, a plurality of spaced ribs 70 and 72, and a central longitudinally extending spar 74. The ribs and spars divide the tank 60 into a plurality of compartments 76 which extend between the top and bottom walls or skins 78 and 80 of the wing. The ribs 70 and 72 and the spar 74 each have a plurality of openings such as openings 82 and 84 which provide communication between the adjacent compartments. Flame arresting devices 86, of which one is in each of the six compartments, are shown as being rectangular shaped hollow blocks positioned on opposite sides of the center spar 74 at the locations shown. One of the blocks 86 is located in each of the fuel compartments and the blocks 86 are substantially smaller in size than the compartments in which they are positioned to thereby further divide the compartments into smaller communicating portions. Furthermore, the blocks 86 are preferably disposed in facewise contact with the opposite flat planar surfaces of the spars 74 to completely cover the openings 84 therein so that all communication between the compartments by way of the openings 84 must also be through the adjacent blocks. The blocks 86 are preferably constructed of resilient plastic and are made to be somewhat longer end-to-end than the distances between the top and bottom walls 78 and 80 so that when they are installed they will be compressed endwise to be frictionally and resiliently held in place. If desired, the blocks 86 can also be made secure by adding other fastener means such as those described above. The blocks 86 therefore cannot shift or move even when subjected to sudden movements of the supporting structure, and to some extent they will also act to impede or reduce fuel movement between compartments thereby also damping any sloshing movements that may occur. Similar blocks can be provided for adjacent to all of the openings between the various fuel compartments, if desired, although this may not be necessary in every case. As explained above, the size of the pores in the blocks should be selected to provide the desired quenching action and the other characteristics, and the blocks should be made as fire resistant as possible.

The use of hollow porous blocks instead of solid porous blocks has the advantages mentioned above. For example, they take up less of the tank capacity, reduce the overall weight, and provide additional flame isolated spaces thereby further dividing the space within the tank for safety reasons. This further reduces the possible volume of fuel that can ignite and explode in a given situation and therefore reduces further the possibility of structural damage caused by the resultant explosion. Any of the materials set forth above can be used in the construction of the blocks 86. The blocks 86 lend themselves to being mass produced and conveniently located in fuel tanks during their manufacture, and they can also be installed relatively easily in existing tanks. In multi-cell tanks where access openings are provided, blocks such as the blocks 86 can usually be inserted relatively easily since they are preferably made of relatively spongy easily compressed materials. If fasteners are required this may complicate the job when installing them in existing tanks.

The sizes and shapes of the blocks may vary considerably and will vary with the sizes and shapes of the individual fuel compartments in which they are installed. If more than one flame arresting member is to be installed in a compartment they will further divide the interior thereof and will effectively isolate each smaller compartment portion from the other so far as flame propagation is concerned. They will operate in the same manner as aforesaid to attenuate the forces of an explosion in one or more of the compartment portions. In a typical situation, the total amount of arrestor material may take up as much as about 10% of the total volume of a fuel compartment though this can vary substantially as required. Since the arrestor material in itself only displaces approximately 3% of its volume the resulting displacement is only about 0.3% of the total tank volume. When the hollow members are used, their voids may be constructed to have widely varying sizes in relation to the block sizes, but in a typical case the voids are constructed to be somewhere within the range from about 10% to 60% of the total compartment volume and the total compartment void of 30% to 90%. This will depend on many factors including convenience, number of members involved, dimensions and so forth. In another embodiment, the outer compartment void, which is the fuel compartment space around the outside of a porous block, was made to be about 45% of the total volume of the fuel compartment, and the inner void, which is the void formed within the block, was also made to be about 45% of the total volume of the compartment providing a 90% grossvoided system. Obviously these examples are given for illustrative purposes only.

In the case of an explosion, the voids in the blocks also serve to relieve the resulting overpressure by acting as arrestor isolated compartments and reservoirs for the expanding gases attenuating the forces and thereby reducing the possibility for damage to the tank structure. If an explosion takes place in the gaseous phase of the tank in the space outside of or around the block, the forces will push the expanding gases into the block which acts as an attenuating reservoir while the opposite will be true of an explosion that takes place within a block. In either case, the expansion wave from the explosion will move in a direction toward the block, and in so doing the flame front will also move against the porous surfaces thereof and in the process will be quenched and suppressed. Furthermore, any combustible vapor present will be driven by the expansion wave through the foam barriers or blocks but will not be able to be ignited as the flame is quenched thereby contributing to prevent the spread of the flame and further reduce the explosion force potential.

Figure 7:
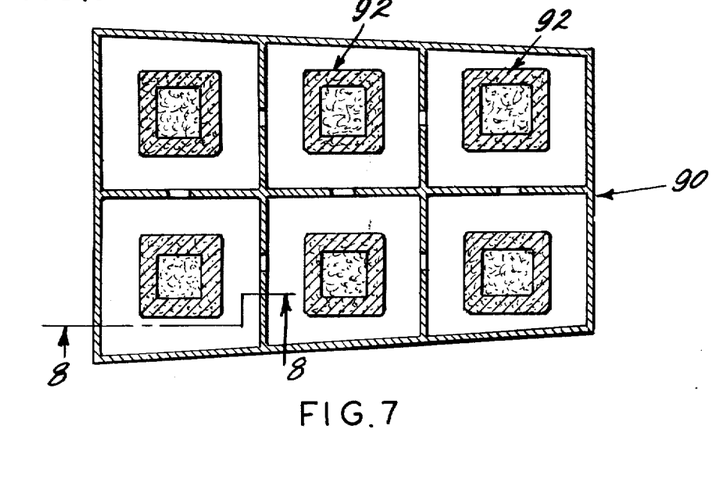
FIG. 7 is a cross-sectional view similar to FIG. 2 showing another modified form of the subject flame arresting system.
Figure 8:
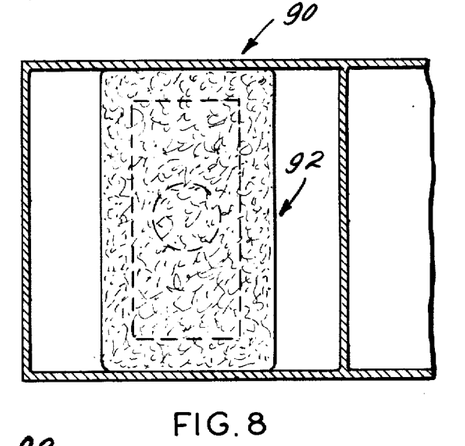
FIG. 8 is a fragmentary cross-sectional view taken along line 8—8 of FIG. 7.

FIGS. 7 and 8 illustrate an embodiment 90 similar to that shown in FIGS. 5 and 6 but differing therefrom by having the hollow flame arresting blocks 92 located more or less centrally in the fuel compartments in spaced relationship to the surrounding wall structures and to the openings therein. In this case, as in the previous case, the blocks 92 may be held in place by being compressed between or otherwise attached to the other opposite walls of the compartments. The embodiment 90 operates in a manner very similar to the structure of FIGS. 5 and 6 and has many of the same desirable features. It differs from the structure of FIGS. 5 and 6, however, because it does not provide porous barriers between the various compartments as such.

Figures 9, 12, 13:
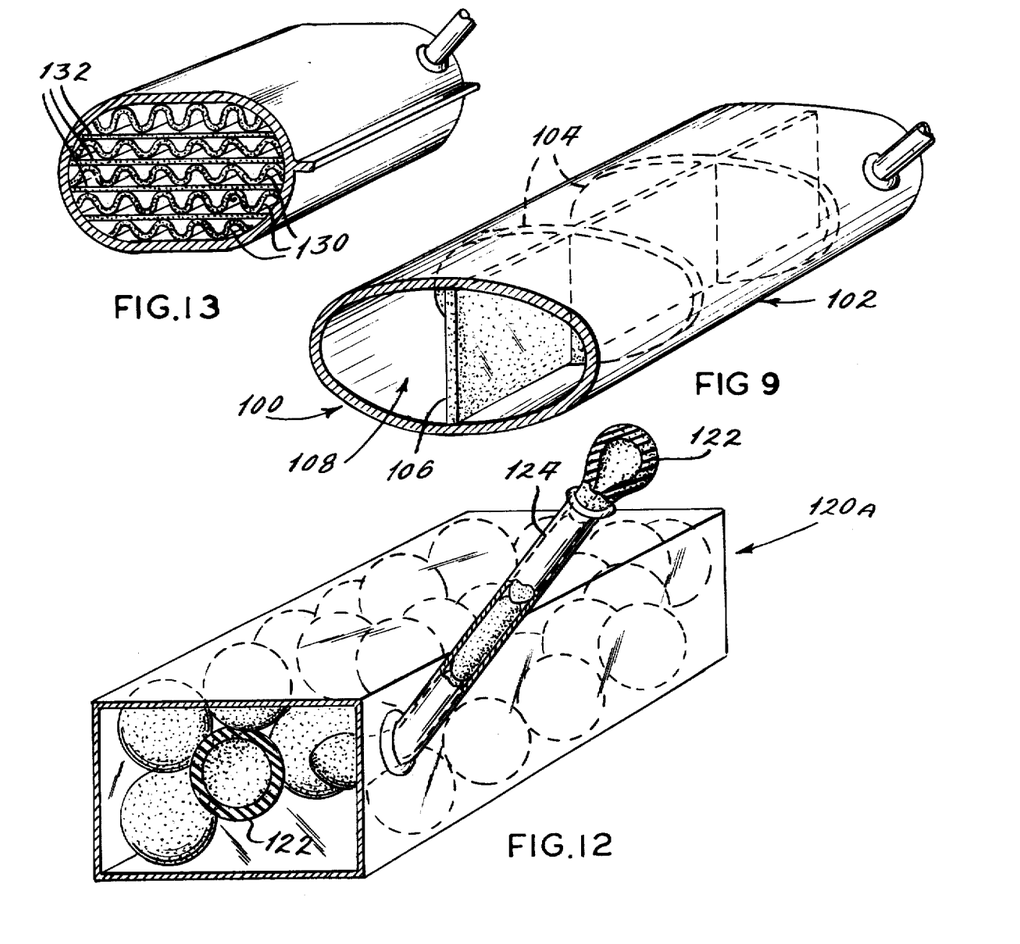
FIG. 9 is a perspective view partially broken away and in section showing another compartmentalized tank structure wherein the compartments are formed by strips of flame arresting material.
FIG. 12 is a perspective view of another single compartment enclosure or tank illustrating a method for introducing hollow spheres of flame quenching material therein.
FIG. 13 is a fragmentary perspective view showing the structural details of another fuel tank embodiment having flame arresting means therein.

FIG. 9 illustrates another embodiment 100 which includes a single-celled structure or tank 102. This embodiment includes a plurality of transversely extending porous strips 104, and a longitudinally extending porous strip 106 which together divide the inside of the tank 102 into a plurality of separate compartments 108. The strips 104 and 106 can be formed of any of the named flame arrestor materials, and can be placed in any of a variety of positions in the tank, as desired. It is also contemplated to use longitudinally and transverse as well as obliquely located strips or combinations of these; the important thing being that the strips divide the interior of the tank into distinct chamber portions or compartments. If fluid in any one or more of the chambers or compartments should become ignited and explode the propagation of the flame will be arrested and quenched in the manner already described for the other embodiments and the pressure wave will be able to pass through the strips into the other adjacent compartments 108 so that its force will be distributed and attenuated throughout the whole interior of the tank rather than being confined to one or several compartments.

Figure 10:
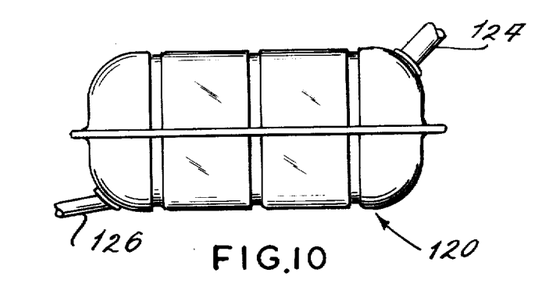
FIG. 10 is a side elevational view of an automobile fuel tank equipped with flame arresting means constructed according to another embodiment of the present invention.
Figure 11:
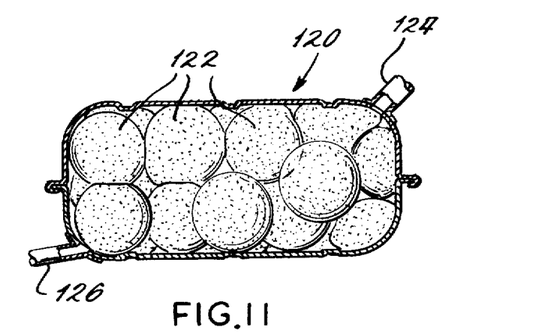
FIG. 11 is a cross-sectional view showing the interior of the modified fuel tank of FIG. 10 wherein the tank is compartmentalized using hollow porous spheres.

FIGS. 10 and 11 illustrate another modified embodiment 120 of the subject device which has a plurality of hollow inert-volume spheres 122 positioned therein. The device 120 may be a single-celled tank such as a fuel tank for an automobile, which tank has an inlet 124 and an outlet 126. The hollow spheres 122 may have any desired size and may vary in shape although it is usually desirable to construct them of sizes and dimensions that make installation relatively easy and prevent them from moving around when installed. Furthermore, because of their flexible nature the spheres may be squeezed or forced into the tank or other enclosure such as by blowing them in through the fuel inlet or outlet 124 and 126 even through these may be much smaller in diameter than the unstressed diameter of the spheres. This manner of installation is illustrated in FIG. 12. The spheres 122 can be forced into the enclosure under pressure and they can also be removed from the enclosure through the inlet or outlet using a vacuum or suction pressure tube which is inserted into the tank therethrough (not shown). These features of the construction 120 make it relatively easy to use and also make it useful for newly constructed fuel tanks and as well as for use with existing tanks. The spheres 122 operate to divide the inside of the tank into a plurality of compartments in the same manner as the other embodiments except that they may even further fragmentize the confined space within the tank and therefore further confine the flame and provide reservoirs to attenuate the explosion. Gross-voiding (volume inside hollow sphere plus volume around outside of packed hollow spheres) of such a configuration is in on the order of 30% to 60% of the tank and displaces less than 2% of the tank volume. FIGS. 11 and 12 show similar tanks 120 and 120A that have their interiors substantially entirely divided by hollow porous spheres.

Figure 17:
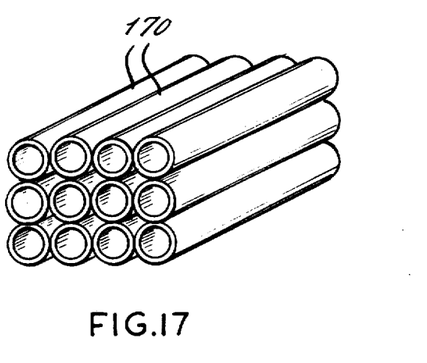

As explained above, single chamber fuel tanks such as those shown in FIGS. 9–12 are in common use including being used as fuselage tanks in some aircraft. Various configurations and materials for use in porous inerting members for positioning in such tanks have been used. One such configuration that has been successfully tested combines features of the spherical embodiments shown in FIGS. 11 and 12 with the features of the tubular embodiment as shown in FIG. 17. In this construction the inerting members were formed by porous tubes eight inches in outside diameter with a tube wall thickness of two inches so that the inside tube diameter was four inches. The ends of these tubes were then capped with hemispherical shaped porous members of the same diameter and thickness as the tubes, and a plurality of these closed end tubes were then stacked in the tank in layers either with all of the members extending in the same direction across the inside of the tank or with alternate layers extending across the tank in different directions. When an explosion was produced in the space between the tubes the flame traveled at a very high rate throughout this space and the accompanying explosion was dissipated throughout the entire interior of the tank including throughout the space confined within the tubes and without damaging the tank. Furthermore, a gross-voided structure such as just described displaced less than 2% of the tank volume or capacity an added relatively little additional weight to the tank. This construction was also easy to install in the tank and with the resilient voided members extending completely across the tank and having their ends abutting the tank walls the members remained in place and did not shift, and they provided protection for the tank regardless of how full the tank was.

FIGS. 13–18 illustrate other embodiments of porous members in various shapes which can also be used to divide the interior of a structural enclosure or tank for the same or similar reasons set forth above. These devices are designed to be used in multi-cell as well as single-cell enclosures. All of these additional embodiments can be constructed of any of the flame arrestor materials mentioned or of combinations thereof. They can also be made to substantially fill the enclosure as illustrated in FIG. 13, or they can be arranged in other ways to fill only a portion of the enclosures.

Figure 14:
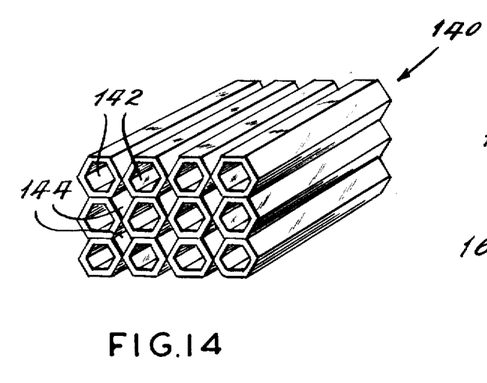
FIG. 14 is a perspective view showing a foam wall honeycomb embodiment of flame arresting structure for use in fuel tanks and the like; and, FIGS. 15–18 are perspective views showing other possible forms of porous flame arresting materials for use in fuel tanks and like structures.

FIG. 13 illustrates a construction in which corrugated porous members 130 are alternated with flat porous spaced members 132. The constructions shown in FIGS. 14–18 include other forms of layered structures but they do not exhaust all of the many possibilities. FIG. 14, for example, shows a honeycomb embodiment of a flame arresting structure 140 which when installed forms a plurality of elongated hexagonal shaped chambers 142 and diamond shaped chambers 144, comprising a gross-voided configuration of 30% to 60% of the tank volume and displacing less than about 2% of the tank volume.

Figure 15:
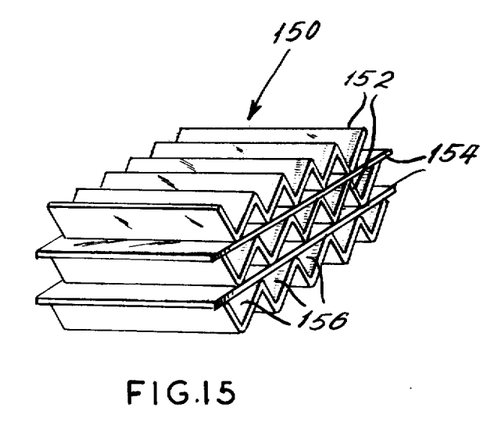

FIG. 15 shows an embodiment 150 which is formed by porous sheets 152 formed with V-shaped peaks and valleys separated by porous flat sheets 154 interposed therebetween. The members or sheets 152 and 154 together form a plurality of elongated triangular shaped chambers 156 comprising a gross-voided configuration as in FIG. 14 above.

Figure 16:
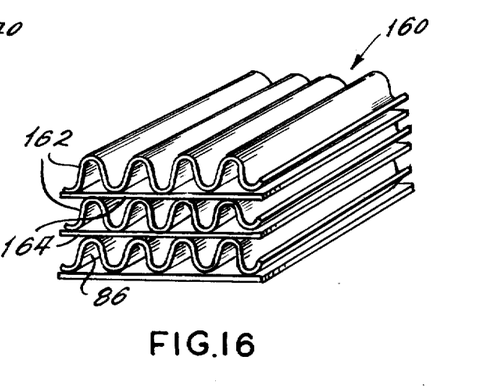

FIG. 16 shows a structure 160 similar to that installed in the tank shown in FIG. 13 and formed by corrugated sheets 162 and flat sheets 164 positioned therebetween.

FIG. 17 shows the use of a plurality of round hollow porous tubular members 170 for installing in a tank. The tubes 170 can be installed as individual pieces or as parts of a single porous structure.

Figure 18:
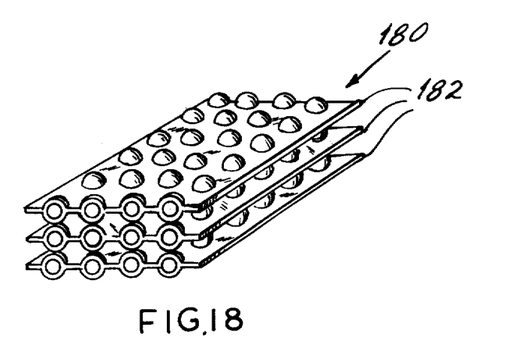

FIG. 18 shows another somewhat more complex layered structure 180 formed by spaced layers 182 which can be separated by flat porous sheets, if desired.

The flame arresting systems of the present invention can be used in any type of structural enclosure including particularly those used for the storage of a combustible fluid or fuel and in so doing provide highly effective means for arresting the propagation of flame, quenching the flame, providing separate arrestor isolated compartments to attenuate combustion overpressure thereby minimizing the possibility for damage should an explosion occur. Thus, some forms of the subject device have application in a wide variety of structures and under many conditions including being used in aircraft fuel tanks, large fuel storage tanks, tankers used for transporting combustible fluids, fuel drums, liquid propane gas tanks, automobile gas tanks and in many other devices where protection from fire and explosion is desired. This includes also use in space environments, mining operations and many other dangerous or potentially dangerous environments.

Thus there has been shown and described novel embodiments of flame arresting, explosion attenuating systems which fulfill all of the objects and advantages sought therefor. Many changes, modifications, variations and other uses and applications of the subject systems will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. An inerting tank construction for containing ignitable fuels which may exist simultaneously therein in a liquid phase and a gaseous phase comprising a structural enclosure, partition means in said structural enclosure dividing the interior thereof into a plurality of individual fuel cells, said partition means having at least one transfer aperture between each pair of adjacent fuel cells to permit fluid communication therebetween so that all of the cells in said enclosure are in communication with each other, and a relatively porous hollow member located in each of said fuel cells further to divide said cells into distinct cell portions, each of said porous members being formed of an open celled material having a pore size and pore density to permit relatively unrestricted liquid and gas flow therethrough and prevent substantial pressure differential from appearing thereacross, at least one of said porous members being located in each associated fuel cell in position to be spaced from all of the partition means which form the said associated fuel cell.

* * * * *